United States Patent [19]

Dunn

[11] 3,942,390
[45] Mar. 9, 1976

[54] VEHICLE DRIVE AND CONTROL SYSTEM
[76] Inventor: Guy A. Dunn, R.R. No. 2, Box 433, Martinsville, Ind. 46151
[22] Filed: Mar. 4, 1974
[21] Appl. No.: 447,924

Related U.S. Application Data
[62] Division of Ser. No. 358,048, May 7, 1973, Pat. No. 3,853,193.

[52] U.S. Cl. ............................. 74/529; 74/473 P
[51] Int. Cl. ..................... B60k 20/08; G05g 5/06
[58] Field of Search ...... 74/473 R, 473 P, 527, 528, 74/529

[56] References Cited
UNITED STATES PATENTS

| | | | |
|---|---|---|---|
| 2,906,139 | 9/1959 | Ferchl et al. | 74/473 |
| 2,961,890 | 11/1960 | Marshall | 74/473 X |
| 3,008,344 | 11/1961 | Dracka | 74/527 |
| 3,255,796 | 6/1966 | Tobey | 74/527 X |
| 3,464,288 | 9/1969 | Sheridan | 74/527 X |
| 3,521,285 | 7/1970 | Mautner | 74/527 X |
| 3,713,664 | 1/1973 | Smolka et al. | 74/527 X |

FOREIGN PATENTS OR APPLICATIONS
1,052,719  11/1955  France .................................. 74/527

*Primary Examiner*—Benjamin W. Wyche
*Assistant Examiner*—Lance W. Chandler
*Attorney, Agent, or Firm*—Woodard, Weikart, Emhardt & Naughton

[57] ABSTRACT

A track laying tractor has a front mounted engine and rear mounted pair of transmissions and right-angle drive units, each transmission and driveunit being provided for one of the two tracks. A single engine output shaft provides input for the two transmissions, through gearbelts, and output speed reducing sprockets and chains are employed between the transmissions and gear boxes for the necessary speed reduction. There are two self-centering track control handles, the left-hand handle controlling the left-hand track, and the right-hand handle controlling the right-hand track.

1 Claim, 4 Drawing Figures

VEHICLE DRIVE AND CONTROL SYSTEM

This is a division of application Ser. No. 358,048, filed May 7, 1973, now U.S. Pat. No. 3,853,193.

BACKGROUND OF THE INVENTION

1. Field of the Invention

This invention relates generally to track-laying tractors, and more particularly to a small sized tractor with precision convenient controls facilitating safe operation.

2. Description of the Prior Art

Of course there are small, track-laying tractors known. Those of which I am aware employ cone clutch arrangements or single transmission units to control the tracks. They have had problems of size, cost, difficulty of maintenance, difficulty of replacement, or combinations of such problems. It is a general object of the present invention to provide an improved tractor drive and control system minimizing or eliminating such problems.

SUMMARY OF THE INVENTION

Described briefly, in a typical embodiment of the present invention, a drive and control system employs separate hydrostatic transmissions and right-angle drive gear boxes to provide power from a common engine output shaft to the left and right-hand tracks, separately and independently. Means are provided for returning the controls to neutral, whenever released by the operator, and the arrangement of the controls, transmissions, and gear boxes is compact and yet readily serviced, if needed.

DESCRIPTION OF THE PREFERRED EMBODIMENT

Figure 1:
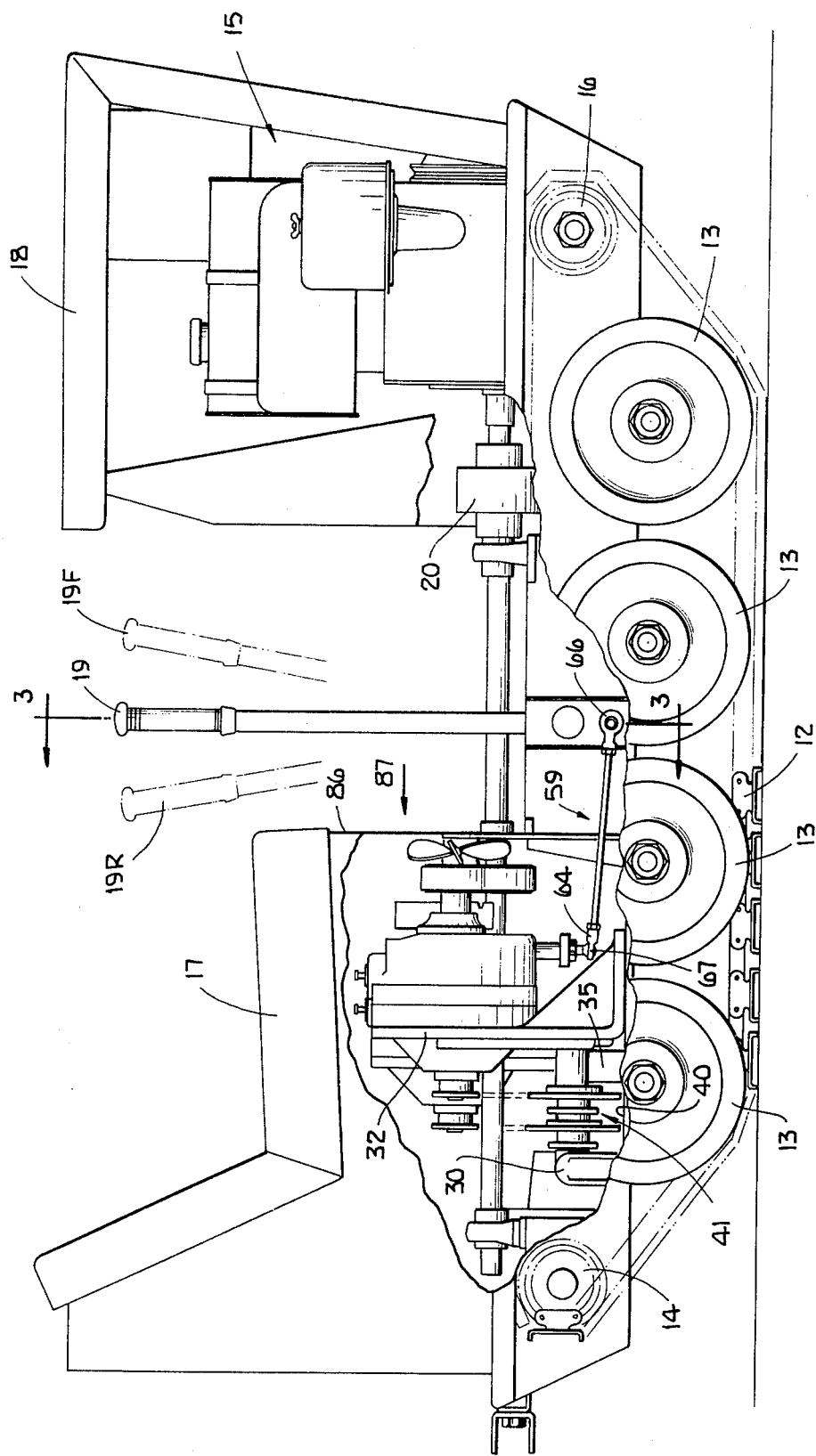
FIG. 1 is a side elevational view of a tracked vehicle, partially cut-away to show interior details, and with some of the links of the right-hand track being shown by solid lines, but the rest being indicated by dashed lines.

Referring now to the drawings in detail, the tractor 11 is supported on two horizontally spaced tracks such as 12, by means of four wheels on each side of the tractor. At the rear, the track runs around the drive sprocket 14, and at the front it runs around an idler sprocket 16, which is spring loaded to maintain tension on the track. Below the seat 17 there are transmissions and right-angle drive units arranged according to this invention, and below the hood 18 there is an engine 15. Two control handles 19 and 21 are provided, to control the right-hand track and the left-hand track, respectively.

Figure 2:
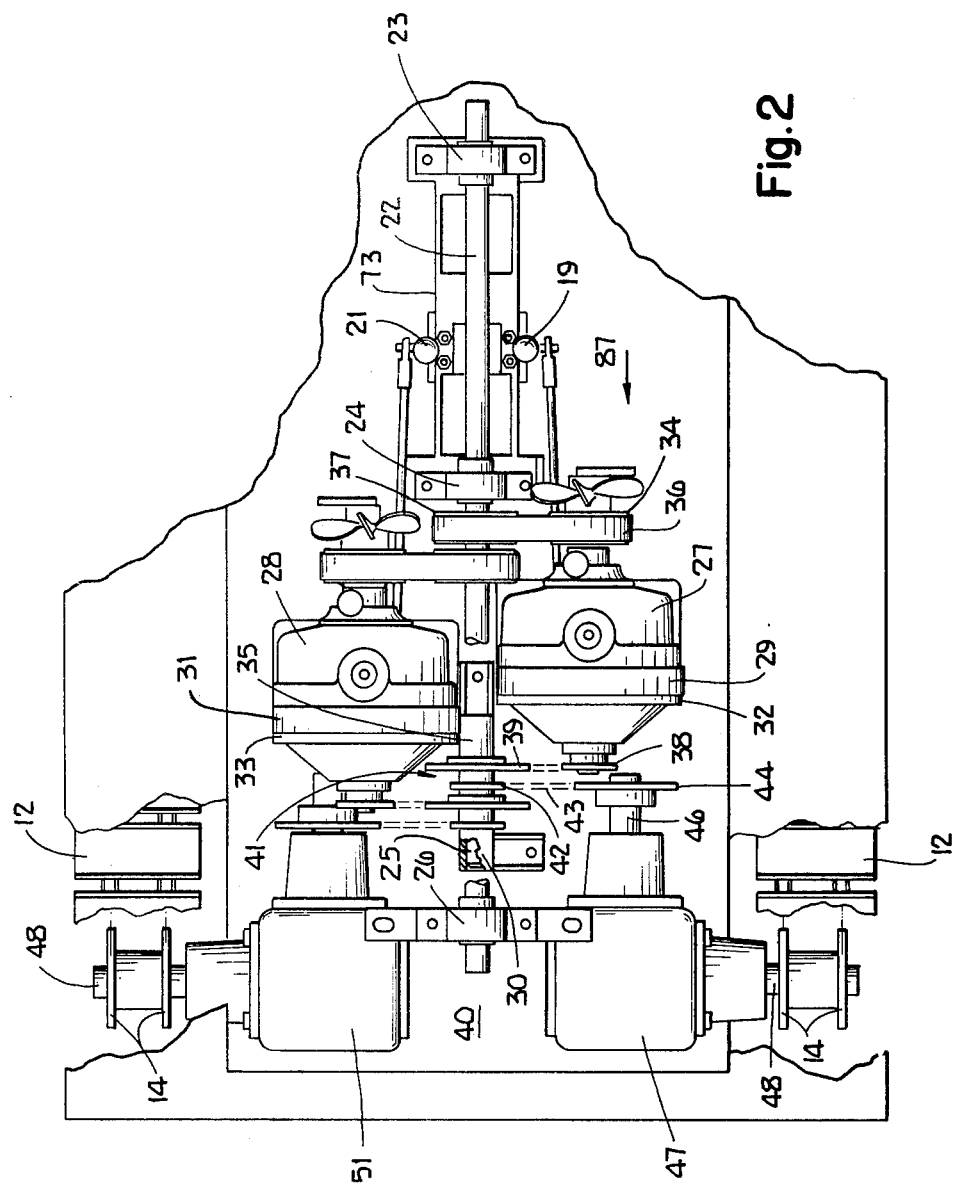
FIG. 2 is a fragmentary top plan view, with portions broken away to show interior details.

Referring more particularly to FIG. 2, an output shaft 22 from the engine is supported in bearings 23, 24 and 26. The front end of this shaft is connected through a universal joint 20 to the crankshaft of the engine.

Two hydrostatic transmissions 27 and 28 are affixed to the vehicle by means of bolting the mounting flanges 29 and 31 respectively thereof to transmission mount castings 32 and 33 respectively, these castings being affixed to the bottom plate 40 of the tractor chassis. A description of one of these transmissions will suffice for both.

Transmission 27 has an input shaft at the front end, to which a gearbelt pulley 34 can be keyed, splined, or affixed by means of a set screw. This pulley is driven by a gearbelt 36 mounted to the gearbelt pulley 37 keyed or splined to the power shaft 22. The other transmission is powered in the same way.

A sprocket 38 is affixed to the output shaft of transmission 27. This is typically a 13 tooth sprocket and is connected by a chain to a 26 tooth sprocket 39 which is part of the cluster-sprocket assembly 41 mounted by means of a bushing on a short, cluster-sprocket support shaft 25, but freely rotatable with respect thereto. The shaft 25 is directly below input shaft 22, and is secured between a pair of brackets 30 and 35 affixed to the tractor chassis bottom plate 40. The cluster-sprocket assembly 41 has a small, thirteen tooth output sprocket 42 thereon driving a chain 43 driving a 26 tooth sprocket 44 connected to the input shaft 46 of the right-angle drive unit 47. The output shaft 48 of the drive unit mounts the track drive sprocket 49 which is keyed or splined thereto.

A transmission which has been found suitable for this purpose is the Model 10 hydrostatic transmission marketed by Eaton Corporation, Fluid Power Division, Marshall Plant, 1101 West Hanover Street, Marshall, Mich 49068. As an example, those employed in the present invention are both identical, and the input shaft rotation is clockwise. The part number is ET-15014-2.

As an example of the right-hand angle drive unit, the Model 66, Hub City right angle bevel gear box, part number 02-21-01795-503, as marketed by the Hub City Division of Safe Guard Industries, Inc., of Aberdeen, S.D. 57401 is suitable for the intended use.

The same kind of arrangement as described for the transmission of power from transmission 27 to the drive unit 47, is employed between the transmission 28 and drive unit 51 for the left track drive pulley which, in the illustrated embodiment, is a sprocket just as it is for the right track drive. It may be noted that the sprocket on the input shaft of the drive unit 51 is located nearer the unit itself than is the sprocket 44 on the drive unit 47, in order to accommodate the end-to-end arrangement of the cluster-sprockets on the cluster-sprocket support shaft 25.

Figure 3:
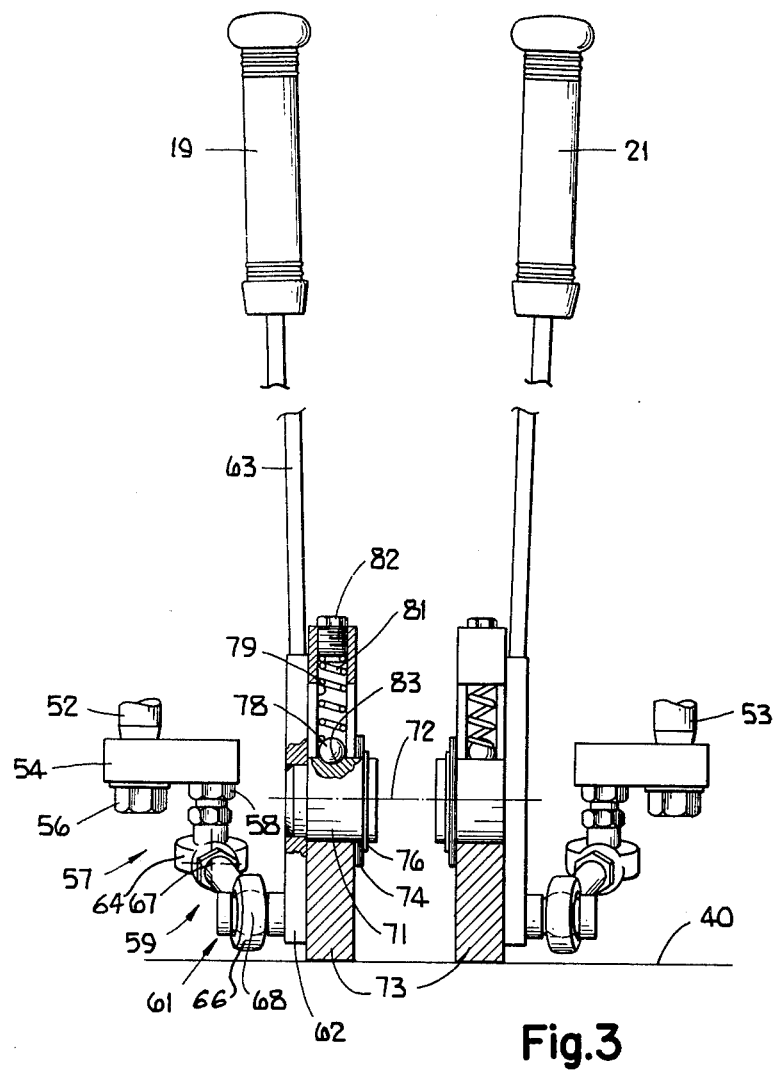
FIG. 3 is a section taken at line 3—3 in FIG. 1 and viewed in the direction of the arrows.

As is best shown in FIG. 3, each of the transmissions is provided with a control shaft, extending downward from the bottom. Shaft 52 is provided on transmission 27, and shaft 53 is provided on transmission 28. The linkage from control handle 19 to control shaft 52 will be described and, as it is essentially the same for control handle 21 and control shaft 53, the latter will not be described.

A right-hand control lever 54 is mounted on the tapered surface of control shaft 52, keyed thereon, and secured in place by the nut and lock washer assembly 56. A ball swivel unit 57 is threadedly received in the arm 54 inboard of the control shaft 52 and secured in place by the jam nut 58. A link 59 is connected between this swivel post and a swivel post 61 threadedly received and thereby affixed in the lower end portion 62 of the control lever arm 63 to which the handle 19 is mounted at the top. The linkage member 59 has a socket 64 at the transmission end, and a socket 66 at the control lever, and each of these sockets is threadedly received on the linkage rod itself for linear adjustment with respect thereto and to thereby provide the desired distance between the center 67 of the pivot point at the lever ball, and the center 68 at the pivot point of the hand lever ball. Jam nuts are provided on the socket units to lock them in place once the desired adjustment has been obtained.

The arm 63 has affixed thereto a journal 71 rotatably mounted on a horizontal axis 72 in a drive shaft mounting bracket 73 affixed to the bottom plate 40 of the tractor chassis. Suitable shims 74 are provided and a snap ring 76 retains the journal in its mounting.

Another feature of the invention is a self-centering spring loaded detent ball 78 received in a bore 79 in the bracket 73 and urged downwardly by a spring 81. The spring is loaded by a cap screw 82 which is threadedly received in the bracket 73.

Figure 4:
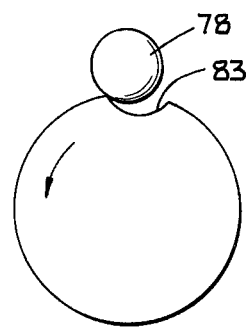
FIG. 4 is a view along the axis of the control handle, and showing the operation of the detent ball.

This ball is received in a hemispherical socket 83 and, as best shown in FIG. 4, will ride up toward the edge of the socket 83 as the lever is moved from the neutral position shown in the solid outline in FIG. 1, to either the full forward, or full reverse positions shown respectively by the dotted lines 19F and 19R in FIG. 1. Therefore, once the operator releases the handle, it will be returned to the neutral position by urging of the ball against the wall of the socket or cup 83, returning it to neutral. When the lever is in the neutral position, the transmission control lever 54 is in the neutral position, and it is the nature of the transmissions employed according to this invention, that the output shaft thereof is thereupon locked. Thus when the lever 54 is in the neutral position, the output sprocket 38 of transmission 27 cannot turn. So it is seen that, if the operator should happen to release both handles, both tracks stop and the vehicle cannot be moved. This is an important safety feature.

For cooling the transmissions, fans are provided on the transmission input shafts immediately under the seat behind the front seat-support wall 86 to provide a movement of air in the direction of arrow 87 at all times that the engine is running, regardless of whether or not the vehicle is running. This flow of air also tends to cool the feet of the operator which are normally disposed on either side of the input or drive shaft bracket 73.

While the invention has been disclosed and described in some detail in the drawings and foregoing description, they are to be considered as illustrative and not restrictive in character, as other modifications may readily suggest themselves to persons skilled in this art and within the broad scope of the invention. For example, speed ratios other than the preferred two to one ratios, can be employed by using different sprocket or gearbelt pulley sizes and tooth numbers, and by using different right-angle gear box reductions from the two-to-one reduction in the above described gear boxes. For some overall ratios, it may be possible to eliminate the jackshaft 25 and clusters thereon.

The invention claimed is:

1. A track drive control lever comprising:
   an arm having a horizontally extending journal near a lower end thereof, and a handle near the upper end;
   a bearing bracket receiving said journal therein for pivoting of said arm about a horizontal axis from an arm home position forward to stop at a full forward position and rearward to stop at a full reverse position; and
   detent means in said bracket and journal and constantly urging said arm toward a home position from every possible position of said arm between full forward position and full reverse position,
   said detent means including a bolt adjustable, spring loaded detent ball in the bracket; and
   detent ball pocket in the journal, said pocket having a wall curved up both ways from the bottom of the pocket toward opposite edges of the pocket at the surface of the journal, said pocket receiving the detent ball therein, the size of the ball and extent of the pocket being established to maintain the ball in contact with at least a portion of the pocket at all pivoted positions of said arm between said full forward position and said full reverse position, whereby as the ball rides up the wall toward one of said edges as said arm is pivoted toward one of said full positions, the spring loaded ball urged downwardly against the wall urges said arm toward home position.

\* \* \* \* \*